United States Patent Office 3,539,424
Patented Nov. 10, 1970

3,539,424
POLYURETHANE FILM AND LAMINATE THEREOF
Irving Tashlick, Boonton, N.J., assignor, by mesne assignments, to Wharton Industries, Inc., Brooklyn, N.Y., a corporation of Delaware
No Drawing. Continuation-in-part of application Ser. No. 728,066, May 9, 1968. This application Apr. 10, 1969, Ser. No. 815,210
Int. Cl. B29c 13/00
U.S. Cl. 156—238        12 Claims

ABSTRACT OF THE DISCLOSURE

Improved method for making laminates including a polyurethane resin film by (A) combining (I) a first isocyanato prepolymer component which is a reaction product of an organic diisocyanate and a glycol, with (II) a second polyol component which is a reaction product of an organic diisocyanate and a diol-triol mixture, to form a quick-curing polyurethane composition having a long pot life; (B) applying the composition to a release surface; (C) partially curing; (D) contacting the partially-cured film with a material, such as fabric or leather, to be laminated thereto; and (E) curing the resin in the laminate. Laminates made by this method include unsupported polyurethane resin films prepared by this method with elimination of the laminating step.

---

This application is a continuation-in-part of application Ser. No. 728,066, filed May 9, 1968.

The present invention relates to methods for making polyurethane films and laminates comprising a polyurethane film and a substrate therefor, and to the films and laminates so produced.

It is known in the art to prepare unsupported polyurethane films and laminates by coating from a solution of a polyurethane resin. Thus, laminates comprising a film of a polyurethane polymer on a substrate such as fabric are made by treating the fabric with a polyurethane lacquer, i.e. a solution of a polyurethane resin in a volatile solvent, and then removing the solvent to form a polyurethane film on the fabric. Such processes employing a solvent are successful only when used to deposit thin films of a polyurethane resin. Further, the resin solutions cannot be applied to highly absorptive substrates such as paper because they wick rapidly through such substrates. Also, the cost of the finished laminates is relatively high.

U.S. Pat. 3,330,713 suggests a method for coating textile fabrics by extruding a film of an uncured polyurethane composition onto a continuous moving sheet of paper coated with a release layer of wax, partially curing said composition by heating, contacting the partially cured film under pressure with a textile fabric to be coated, heating the laminate thus formed to complete the cure of the polyurethane, and separating the laminate from the wax coated paper sheet. The polyurethane compositions are prepared by combining a cross-linking agent, such as a polyol or polyamine, with a prepolymer formed from an aromatic or aliphatic diisocyanate reacted with a polyether, polyester, or polyamine. The prepolymer is a reaction product containing at least two terminal or substantially-terminal isocyanate groups and is cured by reaction with the cross-linking agent in the presence of a catalyst such as an organotin compound. An exemplary final cure time for the compositions of U.S. 3,330,713 is 1 hour at 100° C. (212° F.).

The difficulties encountered in attempting to put this method into practice are discussed in U.S. Pat. 3,278,667. For example, the pot life of the polyurethane compositions is usually so short that fouling of the coating apparatus occurs because of premature curing. If pot life is extended by employing slow-curing resins, then the required time for a final cure of the laminates becomes unfeasibly long. These problems have heretofore made utilization of conventional coating apparatus like that discussed in U.S. 3,330,713 difficult or impossible. Indeed, U.S. 3,278,667 purportedly solves these problems by resort to special methods and to apparatus of unconventional construction.

The present invention is an improvement of the process described and claimed in the aforementioned U.S. Pat. 3,330,713. In the invention, commercially available coating apparatus is suitably used to apply a film of an uncured polyurethane composition to a web having a release surface. A laminate can be formed by partial curing and contact of the partially cured layer with a substrate, followed by curing. The uncured polyurethane compositions employed in the invention have a pot life of about 10 minutes, which assures their utilization without fouling, but yet can be cured in very short time periods, for example 1 minute at 350° F. The method of the invention retains many of the advantageous features of solvent-coating techniques, such as use of a low viscosity coating composition which permits better control of thickness and adhesion, without the drawbacks involved in using resin solutions.

In the present invention, the polyurethane composition is formed just prior to deposition onto the release surfact by the admixture of (I) a liquid prepolymer component having reactive isocyanate groups and prepared by reacting an excess of an aromatic diisocyanate with at least one glycol or glycol ether forming a liquid reaction product with said diisocyanate and (II) a liquid polyol component having reactive hydroxy groups and prepared by reacting an aromatic diisocyanate with an excess of a mixture of at least one diol and at least one triol. Such a polyurethane composition can be applied to a variety of substrates and bonds extremely well to substrates having isocyanate-reactive groups. The latter materials include cellulosic products such as paper, cardboard, cotton and cellulose acetate fabrics, and the like; fabrics or foils of nylon, "Dacron," and other polyamide and polyester polymers; and leather.

The polyurethane films formed in this fashion can be washed or dry-cleaned. Polyurethanes prepared from a polyether polyol component are known in the art to have excellent resistance to water, but to swell by about 20 percent in the usual dry cleaning solvents. However, laminates formed by the present invention between a polyurethane film and a fabric substrate show such excellent adhesion of the layers that the laminates are easily dry cleanable, the fabric acting as a support for the resin film until imbibed solvent has been removed.

The polyurethane films of the present invention are tougher than vinyl polymers, can be made with a soft texture in the absence of plasticizers, are more stable since they are unplasticized, and are thermoset (which also accounts for their good washability and dry-cleanability).

The process of the present invention does resemble that in aforementioned U.S. Pat. 3,330,713 in that a polyurethane composition is coated onto a release surface and then partially cured. However, because the viscosity of the coating mixtures of the present invention is comparatively low, a doctor blade or reverse roll coater can be employed. This permits better thickness control—particularly for thin films—than the extrusion techniques necessary in the prior art. Also, according to the present invention, it is not necessary to use a waxed release surface. Other impermeable release surfaces such as stainless steel can be employed, for example. Polyolefins also show good release properties. It has been found most convenient to employ a conventional commercial release paper (for example paper available under the tradename "Stripkote" having a thin film of a polymeric release agent thereon), the surface of which may be embossed, if desired, to impart a texture pattern to the polyurethane coating laid thereon. Suitably, the release paper is dried by heating prior to being coated to remove moisture which, if present, could lead to foaming of the polyurethane composition deposited thereon, with formation of a porous film. On the other hand, if foaming and porosity are desired, the moisture content of the released paper can be controlled correspondingly.

The fluid polyurethane composition is suitably laid onto a release surface by coating with a doctor blade to form films which may be from less than about 1 mil in thickness to as thick as 250 mils. Polyurethane films as thick as the latter figure cannot be prepared by casting from a solution because the solvent cannot be removed efficiently from films more than about 4 mils thick.

The polyurethane-coated release paper is next heated, suitably by passing under an infrared heater, to effect partial curing of the composition and to render it tacky. The time and temperature necessary for this curing vary inversely, as might be expected, and also vary with the composition being cured and the degree of partial cure desired. The adjustment of these variables in specific cases will be self-evident to those skilled in the art. In general, cure times (for partial cure) less than 1 minute, often 15–30 seconds, are sufficient using infrared panel heaters placed about 2 inches from the resin surface and generating a temperature of 600° F.

At this stage, the polymer is partially cured to have a tackiness comparable with that of chewing gum and may be liquid or semi-solid depending on the substrate to which the tacky material is to be bonded. For example, if a high degree of penetration of the polymer into a substrate is desired or can be tolerated, as for instance when leather is being coated, the composition may be fairly liquid. If fabric or paper is to be coated, the polymer is preferably partially cured to a semi-solid state to reduce its penetration. If an unsupported polyurethane film is wanted, the polyurethane composition may be cured completely at this stage.

If laminates are to be formed, the sticky film is next contacted with the substrate to which it is to be bonded and the combination is passed under pressure rollers to a further heating stage where curing of the polyurethane polymer is completed. The tacky partially-cured polyurethane contacted with the substrate contains quite a few unreacted isocyanate groups which can combine chemically with appropriate substrates to form chemical bonds. For example, cellulosic products such as paper, cotton, cellulose acetate and the like contain isocyanate-reactive hydroxy groups. Proteinaceous materials such as leather contain amino, hydroxy, and sulfhydryl groups which are isocyanate-reactive. Polymers such as the polyamides and polyesters contain hydroxy, amino, and amide groups. The last-mentioned materials, which contain fewer reactive groups than those discussed earlier above, show less firm bonding to polyurethane films. Such chemical bonding of a film to a substrate is not usually possible in prior art techniques forming polyurethane films by casting from a resin solution. The dissolved resin in these solutions is usually already highly cured and contains few unreacted groups. Thus, there is little possibility for bonding to the substrate on which the films are cast.

Further evidence for the presence of a bond between a polyurethane film and a substrate according to the present invention is the face that the polyurethane films of the invention do not bond well to polyolefins, i.e. to materials substantially free of isocyanate-reactive groups. Indeed, polyethylene can be used as a release agent for the polyurethane films. Similarly, the polyurethane compositions of the invention will not bond well to an unprimed metal foil or to glass, but can be bonded easily to metal foil first primed with an organic resin, such as a phenolic resin or butyral resin, in which isocyanate reactive groups are present. Similarly, to promote bonding glass may first be treated with an aminosilane primer having isocyanate reactive amino groups as well as groups suitable for forming a bond to glass.

The laminate formed by contacting the substrate with the tacky polyurethane film is next put under pressure, suitably by passing under pressure rollers, and is then heated further, for example at temperatures of about 250° F. to 400° F., to complete the cure of the polyurethane and to bond it to the substrate. Again, the curing times suitable will depend on the composition involved and on the degree of partial cure already effected. A minimum curing time of 35–40 seconds at 350° F. is recommended, and a complete cure can be readily effected in 1 minute at this temperature. Longer heating times can, of course, be used providing the laminate is not damaged by heating. For very thick films, longer heating at lower temperatures may be advisable to permit the films to equilibrate thermally. However, there is absolutely no need for long curing times like those typically used in the prior art.

Finally, the product comprising an unsupported polyurethane film or a polyurethane film bonded to a substrate is cooled, suitably by passing over cooling drums, separated from the release paper, and rolled up for storage.

The polyurethane composition used in the process of the invention is prepared just prior to the coating step described herein by combining two reactive components. A first prepolymer component (I) is prepared by reacting an excess of an aromatic diisocyanate such as toluene diisocyanate with at least one glycol or glycol ether forming a liquid product with said diisocyanate. The glycol or glycol ether reacted with a given diisocyanate should be one forming a liquid reaction product with the diisocyanate and is preferably of low molecular weight. According to the present invention, commercially useful polyurethane resin polymers comprise between about 1.5 and 2 mols of diisocyanate per 1000 grams of the cured polymer. If the diisocyanate content falls below this value, the tensile strength of the polymer product tends to fall below 2000. With larger amounts of diisocyanate, good tensile strengths of about 6000 are observed in the polyurethane polymers but they become hard and inflexible. By taking into account the composition of the polyol component (II) later described herein and the need for a certain diisocyanate content in the final polymer product, as described above, it can be determined that glycols or glycol ethers having a molecular weight between about 60 and about 1000 can be used with particular success in the process of the present invention to form the prepolymer (I).

When toluene diisocyanate, which is the cheapest commercially available aromatic diisocyanate, is employed in the prepolymer, materials such as ethylene glycol, diethylene glycol, propylene glycol, and 1,3-butylene glycol are not suitable because they form solids on reaction with toluene diisocyanate. On the other hand, polyalkylene ether glycols such as dipropylene glycol, tripropylene glycol, and a polypropylene glycol having a molecular weight of about 400 have been used with particular success to prepare the prepolymer (I).

For preparing the prepolymer, approximately three equivalents of an aromatic diisocyanate are reacted per equivalent of glycol or glycol ether, suitably by slowly adding the glycol component to the diisocyanate to maintain the temperature generated in the mixture by the exothermic reaction of its ingredients between about 50° C. and about 80° C. The glycol component is thoroughly dried prior to reaction with the diisocyanate to remove water which would otherwise react with the diisocyanate and interfere with the glycol reaction. Also, after combination of the dried glycol component with the diisocyanate, the mixture is suitably put under vacuum to assure that the reaction product is gas-free. The resulting liquid prepolymer suitably has a viscosity between about 5000 and about 18,000 centipoises, preferably between about 6000 and 10,000 centipoises, at 25° C. These values assure ease in mixing, metering, and handling in the coating apparatus.

The polyol component (II) is prepared by reacting an aromatic diisocyanate with an excess of a mixture of at least one diol and at least one triol to form a liquid reaction product containing unreacted hydroxy groups therein. Any of a wide variety of diols and triols may be employed in preparing the polyol component, the unreacted hydroxy groups of which react with the unreacted diisocyanate groups of the prepolymer component (I) to form a cross-linked polyurethane resin when the two components are admixed. Polyalkylene ether diols and triols have been used with particular success. The materials used in the present invention are all known in the art and have heretofore been used in the art for making polyurethanes. The diols, for example, generally include a polyether diol or a polyester diol component.

The ratio of triol to diol present in polyol component (II) is such that one cross-link is present in the finished polyurethane polymer for each 2000–15,000 molecular weight units of the polymer. If the amount of triol employed is such as would produce fewer cross-links than indicated above, the development of a non-tacky state in the polymer is unfeasibly slow. If too many cross-links are present, the polymer will tend to have poor physical properties, i.e., brittleness and poor tear strength.

It is surprising and unexpected that the rapid cures observed in practicing the present invention are possible with this relatively small number of cross-links per unit molecular weight. For example, the molecular weight per cross-link in the exemplary systems of U.S. Pat. 3,330,713 is considerably below 2000. The introduction of such a large number of cross-links degrades the physical properties of the polymers, but is prompted by the need for a "fast" cure. However, the time required for curing in these prior art systems is much longer than typical of the resins of the present invention which have 2000 to 15,000 molecular weight units per crosslink.

A stoichiometric excess of the mixture of at least one diol with at least one triol is reacted with an aromatic diisocyanate to form polyol component (II), which is a fluid suitably having a viscosity between about 5000 and about 18,000 centipoises, preferably between about 6000 to 10,000 centipoises. For example, an amount of the mixed polyols containing about 2.5 equivalent parts of hydroxy groups is reacted with about one equivalent part of aromatic diisocyanate by slow addition of the diisocyanate to the polyol mixture. As in the preparation of the prepolymer component (I), steps should be taken to remove water from the reactants, for example by dehydration of the polyols under vacuum at an elevated temperature.

The prepolymeric component (I) and polyol component (II) are suitably reacted in amounts such that the total number of isocyanate groups in components (I) and (II) is in slight stoichiometric excess compared with the total number of hydroxy groups in the two components. Conventionally, a ratio of equivalents, NCO/OH, of about 1.05 (5 percent) is used in the polyurethane art. Below a ratio of about 1.05, a tacky product is obtained. Excess isocyanate in the system assures that the presence of traces of moisture in the system will not significantly interfere with polymerization. Isocyanate groups in excess of those reacting with available hydroxy groups and not otherwise removed form allophanate linkages in the system. Generally, a ratio between about 1.05 to 1.15, preferably about 1.10, is maintained. Above a value of 1.15, long curing times may be required. At ratios between about 1.15 and 1.20, the polyurethane product remains thermoplastic for one or more days.

This phenomenon permits the formation of films and laminates which can be embossed, or re-embossed, or from which embossing can be removed by heating to about 300°±100° F. For example, the use of expensive embossed release surfaces can be dispensed with in producing an embossed product. Rather, the polyurethane film may be laid down on a smooth release surface, such as of steel or even on an irregular release surface, such as of rubber. The thermoplastic material may subsequently be heated and fed to an embossing machine to acquire the desired surface characteristics. After a day or two, the thermoplasticity disappears, possibly by reaction of —NCO groups with atmospheric moisture.

Components (I) and (II) are reacted in the presence of a catalyst conventional for the promotion of the cross-linking of polyurethane resins. As known in the art, these materials may be amines, for example. In the present invention, metal salts such as organic salts of lead, tin, and mercury are preferred catalysts. These materials include catalysts such as di-phenyl mercuric dodecenyl succinate, phenyl mercury salts such as the oleate, fatty acid salts of tin such as stannous octoate and di-butyl tin laurate, and organic lead salts such as the lead naphthenates and oleates. The catalysts are used in amounts, conventional in the art, between about 0.05 to about 0.2 percent by weight of the reactants.

Minor amounts of materials useful as release agents, anti-bubble agents, and anti-blocking agents may be added to the compositions in amounts conventional in the polyurethane resin art. Thus, commercially available organo silicones have been used as release agents, anti-bubble agents, and as surface-active agents having anti-blocking properties. Other suitable anti-blocking agents include the amide and ester waxes such as ethylene diamine di-stearamide, and behenic acid amide.

Pigments and fillers may be dispersed in the polyurethane composition in amounts conventional in the art, alone or in combination with conventional dispersing agents. The catalysts, release agents, fillers, pigments, etc., are most conveniently combined with the polyol component (II) which is of relatively large volume and shows little or no chemical reactivity with these additives.

Unsupported films prepared according to the present invention are useful as oil-resistant packaging films. The films may be slit and woven into upholstery fabrics. Fabric supported films are also of utility as upholstery coverings. Laminates comprising a polyurethane film bonded to an inexpensive leather substrate such as cowhide splits, can be fashioned into shoes and other articles for which top grain leather is usually used.

A better understanding of the present invention and of its many advantages will be had by referring to the following specific examples, given by way of illustration.

EXAMPLE 1

A prepolymer component (I) was prepared by reacting 224.7 grams (2.58 equivalents) of a commercial mixture of toluene diisocyanate containing 80 percent by weight of the 2,4-isomer and 20 percent of the 2,6-isomer with about 60 grams (0.9 equivalent) of thoroughly dried dipropylene glycol. The glycol was slowly added to the isocyanate to maintain a temperature in the mixture between 50° C. and 80° C. The resulting product had a viscosity of 11,700±1000 centipoises.

A polyol component (II) was prepared by combining 274 grams (0.51 equivalent) of a polypropylene ether triol having a molecular weight of about 1610 and commercially available as "Wyandotte TP–1540" with 139 grams (0.252 equivalent) of a polypropylene ether diol having a molecular weight of about 1100 and available under the trade name "P–1010" and 118 grams (1.76 equivalents) of dipropylene glycol. 11 grams of carbon black dispersed in 89 grams (0.089 equivalent) of a polypropylene ether triol vehicle having a molecular weight of about 3000 and commercially available under the trade name "NIAX" were also included in the polyol mixture. The polyhydric mixture was dehydrated under a vacuum of about 10 mm. Hg at a temperature of 110° C. for about one hour. The mixture was then cooled to about 50° C. and 96 grams (1.10 equivalent parts) of toluene diisocyanate were slowly added to form a reaction product having a viscosity of about 12,300±1000 centipoises at 25° C.

11 grams of a 10 percent solution of di-phenyl mercuric dodecenyl succinate in a high boiling naphtha solvent (the mixture is commercially available as Tenneco "Super-Adit") were added to the polyol component as a catalyst, together with about 10 grams of an organo silicone release agent commercially available as "L 522." Dispersion of the carbon black pigment in the mixture can be aided by also adding about 10 grams of a dispersing agent such as soya bean alkyd varnish (Allied Chemical "No. 3177") and/or soybean lecithin.

Prepolymeric component (I) was continuously mixed with polyol component (II) in a weight ratio of about 1:2.55. The mixture was continuously applied with a doctor blade to a commercial polymer-coated release paper as a film 0.004 inch thick. The coated release paper was then passed at a speed of about 6-9 feet per minute through a six foot long tunnel having an infrared panel heater therein at a temperature of 400° F. and at a distance of about 6 inches from the film. (Equivalently, by lowering the panel heaters to 2 inches from the film and raising the temperature to about 600° F., the coated paper can be moved at a speed of about 18 feet per minute through the tunnel.) On emergence from the tunnel, the film had a tacky consistency. The tacky film was contacted with a split cowhide substrate, passed through a series of pressure rollers, and then passed into a forced air furnace about 20 feet long in which a temperature of about 250° F. was maintained. (These conditions had previously been determined as suitable to effect complete cure of the partially cured polymer.) The laminate was then passed to a series of cooling drums in which cold water was circulated. The cooled laminate was wound for storage after separation from the release sheet, which was reused.

The molecular weight per cross-link for the polyurethane polymer prepared as described above is about 5000. A polymer in which the weight per cross-link is about 10,000 can be prepared as described above using the same prepolymer component (I) and a polyol component (II) prepared by first admixing 112.6 grams (0.21 equivalent) of the same "TP-1540" polypropylene ether triol, 299 grams (.546 equivalent) of "P-1010" polypropylene ether diol, 118 grams (1.76 equivalents) of dipropylene glycol, and 90 grams (0.09 equivalent) of "NIAX" polypropylene ether triol (as a vehicle for 16 grams of pigment). This mixture is combined with 96 grams (1.10 equivalent) of toluene diisocyanate to give a product with a viscosity of about 11,000 centipoises.

EXAMPLE 2

A dry-cleanable laminate in which the polyurethane film portion shows a swelling of only about 5 percent in perchloroethylene was prepared by first preparing a prepolymer component (I) from 236.9 grams (2.72 equivalents) of toluene diisocyanate and 62 grams (0.92 equivalent) of dipropylene glycol.

A polyol component (II) was prepared by mixing 42.8 grams (0.30 equivalent) of a polypropylene ether triol having a molecular weight of 428 ("TP440"), 515.2 grams (0.45 equivalent) of an adipic acid/glycol di- and trihydroxy polyester (commercially available as "Multron R-68"), and 98.9 grams (1.47 equivalents) of dipropylene glycol. This mixture was then reacted with 52.3 grams (0.60 equivalent) of toluene diisocyanate to complete component II.

The two components were combined, as in Example 1, in the presence of a catalyst and minor amounts of optional additives as described, and the resulting mixture was coated on a release surface, partially cured, contacted under pressure with fabric, and then cured to form a resin-coated fabric. Knit cotton fabrics and woven cotton sheeting or sateen have been laminated with particular success.

EXAMPLE 3

The polyurethane of Example 1 contains about 1.75 moles of toluene diisocyanate per 1000 grams of polymer, or about 31 percent by weight. A resin having only about 1.5 moles of the diisocyanate per 1000 grams, or about 26 percent by weight, can be prepared from the following:

Component I 177.6 grams (2.04 equivalents) of toluene diisocyanate
47.2 grams (0.70 equivalent) of dipropylene glycol

Component II 445.6 grams (0.51 equivalent) of a polypropylene ether triol ("TP-2540"; MW about 2625)
134 grams (0.134 equivalent) of a polypropylene ether diol ("P-2010"; MW about 2000)
105 grams (1.57 equivalents) of dipropylene glycol
90 grams (0.09 equivalent) of polypropylene ether triol ("NIAX"; MW about 3000; as a vehicle for 60 grams of iron oxide pigment)
95.8 grams (1.10 equivalents) of toluene diisocyanate.

Component (II) had a viscosity of about 14,000 centipoises at 25° C.

EXAMPLE 4

A prepolymer component (I) was prepared by mixing 42.6 parts by weight (0.64 equivalent) of dipropylene glycol and 85.6 parts by weight (0.16 equivalent) of a polypropylene ether diol having a molecular weight of about 1100 ("P-1010"). The mixture was then combined with 210.7 parts by weight (2.42 equivalents) of commercial toluene diisocyanate. The product had a viscosity of 8000 centipoises at 25° C.

A polyol component (II) was prepared by combining 262.2 parts by weight (0.51 equivalent) of a polypropylene ether triol having a molecular weight of about 1610 ("TP-1540"), 223 parts (0.4 equivalent) of a polypropylene ether diol having a molecular weight of about 1100 ("P-1010") and 97.5 parts (1.46 equivalents) of dipropylene glycol. A pigment was ground into a portion of the mixed polyols, which portion was then recombined with the remainder. 2.5 parts by weight of wax, 15 parts by weight of a dispersing agent, and 10 parts by weight of silicone release agent were also added to the mixture.

The mixed polyols were then dehydrated and combined with 78.4 parts by weight (0.90 equivalent) of toluene diisocyanate, and 11 parts by weight of the catalyst solution of Example 1 were combined with this polyol component after the reaction exotherm had subsided. The resulting polyol component (II) had a viscosity of 6400 centipoises at 25° C.

Prepolymer component (I) was continuously mixed with polyol component (II) in a weight ratio of about 1:1.95, corresponding with an NCO/OH ratio of about 1.1. The mixture was continuously applied to a release paper, partially polymerized, laminated to a substrate, and cured as in Example 1.

What is claimed is:

1. In a method for the lamination of a polyurethane film to a substrate therefor by coating a continuous moving web having a release surface with a solvent-free polyurethane composition, partially curing the resulting film of polyurethane composition by heating, contacting the partially cured film under pressure with said substrate, heating the film and substrate to complete the cure of said film, and then removing the laminate so formed from the release surface of said web, the improvement wherein said polyurethane composition is formed immediately prior to said coating step by mixing, in the presence of a catalyst for the cross-linking of polyurethane resins, substantially equivalent quantities of:
- (I) a liquid prepolymer component having reactive isocyanate groups and prepared by reacting an excess of an aromatic diisocyanate with at least one glycol or glycol ether forming a liquid product with said diisocyanate; with
- (II) a liquid polyol component having reactive hydroxy groups and prepared by reacting an aromatic diisocyanate with an excess of a mixture of at least one diol and at least one triol.

2. The method as in claim 1 wherein said polyurethane composition is applied with a doctor blade or reverse roll coater as a film between 0.5 mil and 50 mils thick.

3. The method as in claim 1 wherein said substrate is leather.

4. The method as in claim 1 wherein said substrate is fabric.

5. The method as in claim 1 wherein both said prepolymer component (I) and said polyol component (II) have a viscosity between about 5000 and 18,000 centipoises at 25° C.

6. The method as in claim 5 wherein said prepolymer component (I) is prepared by reacting about 3 equivalent parts of an aromatic diisocyanate with about 1 equivalent part of glycol forming a liquid reaction product therewith.

7. The method as in claim 5 wherein said polyol component (II) is prepared by reacting a mixture of diols and triols containing about 2.5 equivalent parts of hydroxy groups with about 1 equivalent part of an aromatic diisocyanate.

8. The method as in claim 7 wherein said mixture of diols and triols includes a polyether.

9. The method as in claim 7 wherein said mixture of diols and triols includes a polyester.

10. A product prepared according to claim 1.

11. A method for making a polyurethane film which comprises forming a solvent-free polyurethane composition by mixing, in the presence of a catalyst for the cross-linking of polyurethane resins, substantially equivalent quantities of:
- (I) a liquid prepolymer component having reactive isocyanate groups and prepared by reacting an excess of an aromatic diisocyanate with at least one glycol or glycol ether forming a liquid product with said diisocyanate; with
- (II) a liquid polyol component having reactive hydroxy groups and prepared by reacting an aromatic diisocyanate with an excess of a mixture of at least one diol and at least one triol, coating a continuous moving web having a release surface with said polyurethane composition, curing the resulting film of polyurethane composition by heating, and removing the film from the release surface of said web.

12. A product prepared according to claim 11.

References Cited

UNITED STATES PATENTS

| | | | |
|---|---|---|---|
| 2,593,553 | 4/1952 | Francis | 156—540 |
| 3,255,061 | 6/1966 | Dobbs | 156—247 |
| 3,328,225 | 6/1967 | Urbanic et al. | 156—247 X |
| 3,410,817 | 11/1968 | McClellan et al. | 156—331 X |
| 3,428,609 | 2/1969 | Chilvers et al. | 117—155 X |
| 3,483,073 | 12/1969 | Pounder et al. | 161—190 |

FOREIGN PATENTS 469,474 11/1950 Canada.

LELAND A. SEBASTIAN, Primary Examiner

U.S. Cl. X.R.

117—155, 161; 156—247, 272, 289, 331; 161—190, 406; 260—77.5